United States Patent [19]

Kim et al.

[11] Patent Number: 4,462,913

[45] Date of Patent: Jul. 31, 1984

[54] PROCESS FOR TREATING WASTEWATER CONTAINING FAT AND HEAVY METAL IONS

[75] Inventors: Bang M. Kim, Schenectady; Paul A. Amodeo, Jr., Albany, both of N.Y.

[73] Assignee: General Electric Company, Schenectady, N.Y.

[21] Appl. No.: 319,530

[22] Filed: Nov. 9, 1981

[51] Int. Cl.$^3$ .............................................. C02F 1/62
[52] U.S. Cl. ................................... 210/708; 210/716; 210/724; 210/912
[58] Field of Search ............... 210/709, 724, 726, 912, 210/914, 708, 716, 717

[56] References Cited

U.S. PATENT DOCUMENTS

| | | | |
|---|---|---|---|
| 3,740,331 | 6/1973 | Anderson et al. | 210/53 |
| 3,956,117 | 5/1976 | Bradley et al. | 210/708 |
| 4,005,009 | 1/1977 | Kinoshita et al. | 210/912 X |
| 4,102,784 | 7/1978 | Schlauch | 210/47 |
| 4,278,539 | 7/1981 | Santhanam et al. | 210/724 |
| 4,329,224 | 5/1982 | Kim | 210/724 X |

OTHER PUBLICATIONS

Kim, B. M.–"Treatment of Metal Containing Wastewater by Sulfide Precipitation", Nov. 16–20, 1980, See p. 8–Am. Inst. of Chem. Engineers Meeting.
Kemmer, F., Editor, NALCO Water Handbook, Chapter 8, (Coagulation and Flocculation)–McGraw-Hill, 1979.
Kemmer, F., Editor, NALCO Water Handbook, Chapter 11 (Emulsion Breaking)–McGraw-Hill, 1979.
Robinson, A. K. & Sum, J. C.–Sulfide Precipitation of Heavy Metals–Research Report, (1979), U. S. Env. Prot. Agency.
Robinson, A. K., "Sulfide vs. Hydroxide Precipitation of Heavy Metals from Indus. Wastewater." EPA Report, Nov. 1978.

Primary Examiner—Thomas G. Wyse
Attorney, Agent, or Firm—John F. Ahern; Paul Checkovich

[57] ABSTRACT

Heavy metal pollutant ions and emulsified fat are removed from a wastewater stream in a two-stage process. The first stage involves the demulsification and removal of fat through the use of chemical emulsion breakers leaving residual fat in suspension and in solution. The second stage involves the preparation and introduction of a calcium sulfide mixture to the wastewater resulting in the precipitation of the heavy metal ions as sulfides and the precipitation of residual fat.

9 Claims, 2 Drawing Figures

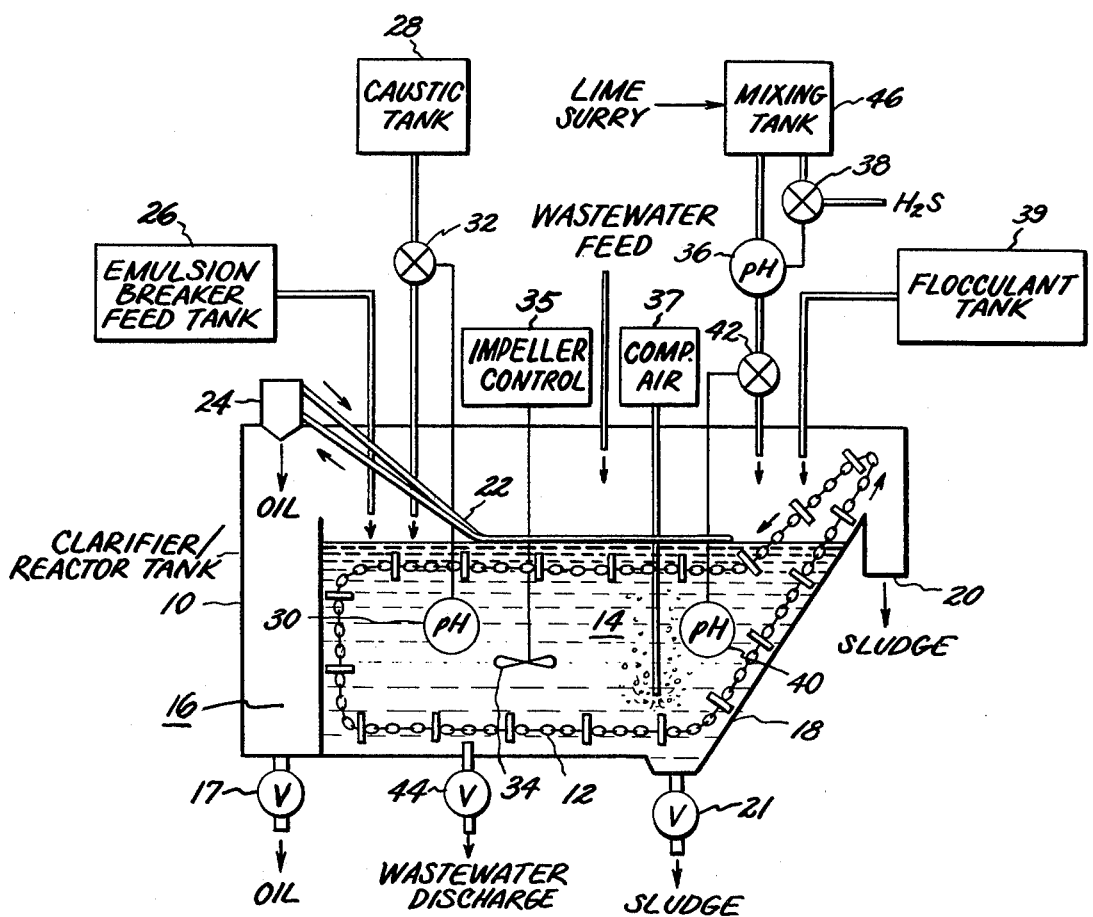

4,462,913

PROCESS FOR TREATING WASTEWATER CONTAINING FAT AND HEAVY METAL IONS

BACKGROUND OF THE INVENTION

This invention relates to wastewater treatment processes, and more particularly, to such processes involving the removal of fats and heavy metal ions.

In recent years, an increasing importance has been placed upon treatment of wastewater from industrial processes in order to remove at least priority pollutants therefrom. The instant application concerns itself with the treatment of wastewater produced in wire drawing or rolling. Such wastewater normally contains emulsified synthetic fat and dissolved copper or other heavy metals. The direct discharge of these materials to the environment results in high organic loading, thereby increasing the biological oxygen demand and results in an increase in the toxic metal levels which have deleterious effects on aquatic and human life.

One of the methods currently used to treat industrial wastewater like that described above involves the evaporation of the waste to produce clean water and concentrated waste. The capital and operating costs required to support the evaporation process are quite high. Moreover, further treatment of the concentrated waste is required before disposal. Other processes involving the application of heat and the use of inorganic chemicals have been proposed, but these too have proven to be uneconomical and in some cases, only partially effective.

It is an object of the present invention to provide an improved wastewater treatment process which enables a substantially complete removal of synthetic fats and pollutant metal ions.

It is also an object of the present invention to provide an apparatus utilizing a single vessel in which both the separation of fat and metal ions can be accomplished.

It is a further object of this invention to provide a treatment process and associated equipment which will permit the use of existing equipment with reasonable modifications for the process described below.

Still another object of the present invention is to provide a process of the type described which will permit disposal of the treated wastewater through ordinary wastewater disposal systems, thereby reducing the bulk of material to be landfilled.

SUMMARY OF THE INVENTION

The above and other objects and benefits are obtained through the practice of the present invention which involves the main steps of demulsification and removal of fats followed by precipitation of residual fat and copper ions through the use of a calcium sulfide mixture comprising $Ca(OH)_2$, $CaS$ and $Ca(HS)_2$ in solution. In a preferred embodiment of this invention both stages of this process are carried out in the same vessel.

BRIEF DESCRIPTION OF THE DRAWINGS

FIG. 2 is a schematic drawing illustrating the apparatus of this invention.

Referring to FIG. 1, it will be seen that the subject process occurs in two main stages. The first is the demulsification and removal of fat and the second is the precipitation of residual fat and heavy metal ions by adding a calcium sulfide mixture. The process is completed upon removal of the sludge containing the precipitates.

Figure 1:
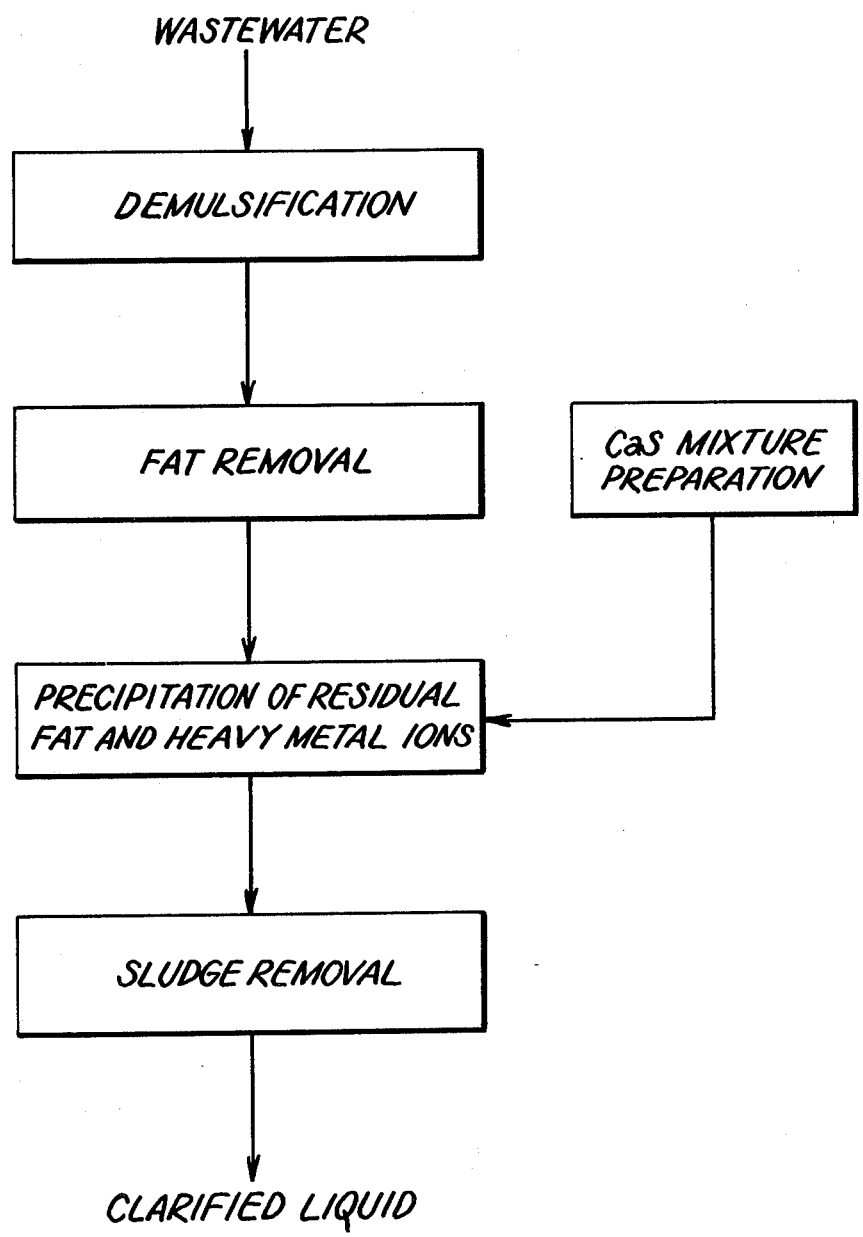
FIG. 1 is a flow chart setting forth the main steps of the subject invention.

The process may be conveniently carried out with apparatus such as that illustrated in FIG. 2. As shown, the main vessel required is a clarifier/reactor tank 10. Tanks having the same general configuration are normally associated with wire drawing operations. By modifying such tanks as indicated below, they may be used in practicing the present invention. Tank 10 consists of two main compartments, a treatment and clarifying compartment 14 and a fat removal compartment 16. On one end the tank is provided with an inclined side 18 leading to a sludge outlet 20. Sludge is also removed by way of valved sludge outlet 21 in bottom of compartment 14. A sludge scrapper 12 is mounted within the tank for moving settled sludge from the bottom of tank 10 to sludge outlets 20 and 21. Sludge scrapper 12 is typically one of the type having transverse boards commonly referred to as "flights" which are drawn by sprocket driven chains in a continuous loop pattern as shown in FIG. 2. A fat skimmer 22 is provided for the removal of demulsified fats which float as scum on the surface of the wastewater being treated. Skimmer 22 is preferably of the floating tube type, although any suitable system will suffice. The model 5-H skimmer manufactured by Oil Skimmers, Inc., has worked well with our invention. With this type of skimmer, a floating flexible tube is drawn in a closed loop on the surface of the water being treated. The tube is made of a flexible specially formulated plastic which attracts oil but not water. The tube is drawn through scrapers located near its driving mechanism 24 where the fat is removed and permitted to drop into oil compartment 16.

After a batch of wastewater is delivered to tank 10, the treatment process of this invention begins with the introduction of an emulsion breaker which may be supplied from its storage tank 26. Depending upon the particular wastewater being treated and the particular emulsion breaker being used, it may be desirable to adjust the pH of the wastewater at this time. It has been found, for example, that an emulsion breaker identified as Praestaminol 2157 produced by Stockhausen works most effectively at a pH level of about 8. The adjustment of pH level may be accomplished by the introduction of sodium hydroxide from its storage tank 28 while controlling the rate of delivery through the use of a conventional monitor 30 and control valve 32.

Following the introduction of the emulsion breaker, the wastewater is agitated at high speed by activating impellers 34 to insure thorough mixing and contact. After that, the impellers are operated at a slow rate to enhance the contacting of demulsified oil particles so as to promote flocculation and coalescence into large particles. Conventional control circuits 35 are associated with impellers 34. Following flocculation, the fat may be permitted to rise to the surface or settle to the bottom depending upon its density. To promote surface removal, our preferred embodiment contains means 37 to aerate the mixture during the rapid agitation step described above. There it is easily removed by means of the skimmer system 22, 24 and delivered to fat compartment 16 from which it can be removed through a valved oil discharge outlet 17. The foregoing procedures result in the substantial removal of fat from the wastewater. However, residual amounts remain therein in suspension and in solution.

The next stage in the treatment process involves the introduction of a calcium sulfide mixture for the removal of heavy metal ions such as copper ions. This stage of the process is described in detail in pending patent application Ser. No. 206,798, filed Nov. 14, 1980, and issued as U.S. Pat. No. 4,329,224, by one of the inventors herein and entitled, "Wastewater Treatment Process". The contents of that patent application are incorporated herein by reference. Briefly stated, this stage of the process involves the preparation of a fresh calcium sulfide mixture by contacting a lime slurry with hydrogen sulfide gas in a mixing tank 46 and then delivering quantities of the mixture to the wastewater in the clarifier/reactor tank 10. Alternatively, the calcium sulfide mixture can be prepared by contacting a lime slurry with sodium hydrosulfide. In any event, the calcium sulfide mixture will contain CaS, Ca(OH)$_2$ and Ca(HS)$_2$ in solution.

The calcium sulfide mixture is monitored as it is delivered to tank 10 in order to determine its pH level. It is desirable to maintain a pH level for the mixture of about 12. This is accomplished by a conventional pH monitor 36 and control valve 38 which regulates the rate of delivery of hydrogen sulfide to mixing tank 46. In clarifier/reactor tank 10, the copper ions readily combine with the sulfide species of the calcium sulfide mixture when the pH level of the wastewater reaches a level of about 9. Thus, the introduction of the calcium sulfide mixture to clarifier/reactor tank 10 is regulated by means of pH monitor 40 and pH control valve 42 so that this approximate level is maintained.

In the course of our experiments with this process, we discovered that the calcium species of the calcium sulfide mixture is effective to remove the residual fat remaining in the wastewater. It is our belief that the calcium ions react with the fat to produce agglomerations which settle out as precipitates. Once the reaction from storage tank 39 with the calcium sulfide mixture goes to completion, polyelectrolytes are added to flocculate the precipitates. The clarified wastewater may be drawn off through the valved wastewater discharge port 44. (As noted earlier, sludges are moved by scraper 12 to sludge discharge outlets 20 and 21.)

EXAMPLE 1

A pilot scale demonstration was performed using wastewater containing Lusol WD 4X lubricant and containing 1200 ppm copper and emulsified fat. Approximately 90 gallons of the waste was treated with an emulsion breaker, Colloid Piepho NT-75, for the removal of fat. The remaining demulsified solution containing copper and residual fat was agitated slowly as the calcium sulfide mixture was pumped to the tank at approximately 70 ml/min. The calcium sulfide mixture had been prepared by passing hydrogen sulfide through a 4% lime slurry until it reached a pH of 12.2. The addition of the calcium sulfide mixture was terminated as the pH of the wastewater reached a level of 9.3, which was determined to be desirable by a previous laboratory test using a sample of similar wastewater. The volume of calcium sulfide mixture added was approximately 3.7 liters. The reaction of the waste and calcium sulfide mixture alone produced settleable flocs which consisted of CuS and residual fat. The reacted waste solution was agitated vigorously as a polyelectrolyte (0.5% solution of Cyanamid Magnifloc 836A) was added. After adding 340 ml of the polyelectrolyte, the waste was agitated slowly to produce large flocs. The waste was settled approximately 10 minutes and the top layer liquid was sampled for analysis. The copper content of this sample was later determined as 1 ppm. It was also found that residual fat was effectively removed producing a clear solution.

EXAMPLE 2

Approximately 1000 gallons of Rycosol waste containing 67 ppm copper and emulsified fat was treated. The waste was treated in a first tank with an emulsion breaker. Aeration of the waste provided sufficient mixing and floated the fat. The demulsified waste still containing residual fat and dissolved copper was pumped to a second tank. This reactor/clarifier was equipped with mixers which were used to agitate the waste slowly as the calcium sulfide mixture was pumped into the tank at 100 ml/min. The calcium sulfide mixture had been prepared by passing H$_2$S through a 4% lime slurry until the pH reached 12.2. The addition of the CaS mixture was terminated when the pH of the solution reached 9.4 from its initial pH of 4.7. The total amount of CaS added was approximately 9 gallons. No H$_2$S odor was detected from the reactor/clarifier during CaS addition. Next, two gallons of polyelectrolyte (0.5% solution of Cyanamid Magnifloc 836A) was added to make the concentration 5 ppm in the tank. After mixing the waste vigorously for 5 minutes, the flocs were allowed a period of quiescent settling. The majority of flocs were settled after 30 minutes. Analysis of the supernatant solution showed 1.8 ppm copper concentration.

The above-described embodiments of this invention are intended to be exemplitive only and not limiting and it will be appreciated from the foregoing by those skilled in the art that many substitutions, alterations and changes may be made to the disclosed processes without departing from the spirit or scope of the invention. For example, modifications could be made in the described apparatus to permit continuous treatment of wastewater rather than batch treatment.

What is claimed is:

1. A process for treating wastewater containing emulsified oil and heavy metal ions so as to substantially remove both therefrom comprising the steps of:
   A. forming a scum of a quantity of the oil by adding and mixing an emulsion breaker with said wastewater so as to leave only relatively small residual amounts of oil in suspension and in solution;
   B. separating the scum from the rest of the wastewater;
   C. adding enough of an aqueous calcium sulfide mixture to the wastewater to precipitate heavy metal ions and residual oil therefrom, said aqueous calcium sulfide mixture consisting essentially of CaS, Ca(OH)$_2$ and Ca(HS)$_2$ in solution; and
   D. separating the precipitate from the remaining wastewater.

2. A process for treating wastewater containing heavy metal ions and a residual amount of oil so as to substantially remove both, comprising the steps of:
   A. adding enough of an aqueous calcium sulfide mixture to the wastewater to precipitate heavy metal ions and said residual amount of oil therefrom, said aqueous calcium sulfide mixture consisting essentially of CaS, Ca(OH)$_2$ and Ca(HS)$_2$ in solution; and
   B. separating the precipitates from the remaining wastewater.

3. The process of claim 1 or 2 wherein the CaS mixture is formed by contacting a lime slurry with a quantity of $H_2S$ or NaHS.

4. The process of claim 3 wherein the quantity of $H_2S$ contacted with the lime slurry is controlled by sensing the pH level of the CaS mixture formed and by decreasing the quantity of $H_2S$ provided for contacting when the sensed pH level is below a predetermined value.

5. The process of claim 4 wherein the predetermined value is approximately 12.

6. A process as in claim 1 or 2 wherein the addition of CaS mixture to the wastewater is controlled by sensing the pH level of the wastewater upon addition of the CaS mixture thereto, and decreasing the rate of CaS mixture addition when the sensed pH level exceeds a predetermined value.

7. A process as in claim 6 wherein said predetermined value is between 7 and 10.

8. A process as in claim 7 wherein the precipitate separating step includes the step of mixing at least one flocculant with the wastewater.

9. A process as in claim 1 wherein the scum-separating step includes aerating the mixed wastewater and emulsion breaker so as to float the scum and skimming the scum from the surface of the wastewater.

* * * * *